US011115576B2

(12) United States Patent
Gruhlke et al.

(10) Patent No.: US 11,115,576 B2
(45) Date of Patent: Sep. 7, 2021

(54) SENSOR MODULE WITH A COLLAR CONFIGURED TO BE ATTACHED TO A CAMERA MODULE FOR A USER DEVICE

(71) Applicant: QUALCOMM Incorporated, San Diego, CA (US)

(72) Inventors: Russell Gruhlke, San Jose, CA (US); Jon Lasiter, Stockton, CA (US); Ravindra Vaman Shenoy, Dublin, CA (US); Ravishankar Sivalingam, San Jose, CA (US); Kebin Li, Fremont, CA (US); Khurshid Syed Alam, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/521,222

(22) Filed: Jul. 24, 2019

(65) Prior Publication Data

US 2020/0314305 A1 Oct. 1, 2020

Related U.S. Application Data

(60) Provisional application No. 62/826,667, filed on Mar. 29, 2019.

(51) Int. Cl.
*H04N 5/225* (2006.01)
*H04N 5/232* (2006.01)
*H04M 1/02* (2006.01)

(52) U.S. Cl.
CPC .......... *H04N 5/2257* (2013.01); *H04N 5/232* (2013.01); *G03H 2227/02* (2013.01); *H04M 1/0202* (2013.01)

(58) Field of Classification Search
CPC .. H04N 5/23212; H04N 5/2253; H04N 5/374; H04N 5/335; H04N 5/33; H01L 27/14607; H01L 27/14665; H01L 27/14627; G02B 3/00; G01B 11/026; G01B 7/023; G01B 21/02
See application file for complete search history.

(56) References Cited

U.S. PATENT DOCUMENTS

| 10,419,588 | B2 * | 9/2019 | Zhou | G01J 1/4204 |
| 2005/0253951 | A1 * | 11/2005 | Fujimoto | H04N 5/2253 |
| | | | | 348/335 |
| 2010/0165155 | A1 * | 7/2010 | Chang | H04N 5/232 |
| | | | | 348/262 |

(Continued)

FOREIGN PATENT DOCUMENTS

EP  3441846 A3  5/2019

OTHER PUBLICATIONS

International Search Report and Written Opinion—PCT/US2020/017020—ISA/EPO—dated Apr. 20, 2020.

*Primary Examiner* — Hung H Lam
(74) *Attorney, Agent, or Firm* — Qualcomm Incorporated (57) ABSTRACT

Various aspects of the present disclosure generally relate to a sensor module. In some aspects, a sensor module may include a collar configured to be attached to a camera module for a user device. The collar may include a first opening that is configured to align with an aperture of a camera of the camera module, and a second opening. The sensor module may include a sensor embedded in the collar. The sensor may be aligned with the second opening of the collar. Numerous other aspects are provided.

31 Claims, 7 Drawing Sheets

(56) References Cited

U.S. PATENT DOCUMENTS

| | | | |
|---|---|---|---|
| 2010/0231779 A1* | 9/2010 | Lin | G03B 35/08 |
| | | | 348/335 |
| 2011/0312349 A1* | 12/2011 | Forutanpour | G06F 1/163 |
| | | | 455/466 |
| 2016/0037070 A1* | 2/2016 | Mandelli | H04N 5/378 |
| | | | 348/322 |
| 2016/0050346 A1* | 2/2016 | Liu | H04N 5/2256 |
| | | | 348/46 |
| 2016/0191769 A1 | 6/2016 | Yeh et al. | |
| 2017/0220844 A1* | 8/2017 | Jones | G06F 3/0421 |
| 2017/0353699 A1* | 12/2017 | Wang | H04N 5/23245 |
| 2018/0031728 A1 | 2/2018 | Han | |
| 2018/0328717 A1* | 11/2018 | Fordham | G01B 7/023 |
| 2019/0191062 A1* | 6/2019 | Ko | H04N 5/2254 |
| 2019/0349523 A1* | 11/2019 | Song | G03B 3/10 |

\* cited by examiner

SENSOR MODULE WITH A COLLAR CONFIGURED TO BE ATTACHED TO A CAMERA MODULE FOR A USER DEVICE

CROSS-REFERENCE TO RELATED APPLICATIONS UNDER 35 U.S.C. § 119

This application claims priority to U.S. Provisional Patent Application No. 62/826,667, filed on Mar. 29, 2019, entitled "SENSOR MODULE FOR A USER DEVICE," which is hereby expressly incorporated by reference herein.

FIELD OF THE DISCLOSURE

Aspects of the present disclosure generally relate to sensor modules, and to a sensor module for a user device.

BACKGROUND

Sensors are used within user devices for various purposes. Such sensors may be used to sense one or more characteristics associated with the user device. Such characteristics may include one or more characteristics of an environment of the user device. For example, one or more sensors may be configured to detect whether a user is present, detect motion, measure ambient lighting, and/or the like.

SUMMARY

In some aspects, a sensor module may include a collar configured to be attached to a camera module for a user device, wherein the collar includes: a first opening that is configured to align with an aperture of a camera of the camera module, and a second opening; and a sensor embedded in the collar, wherein the sensor is aligned with the second opening of the collar.

In some aspects, a camera module may include a camera, wherein the camera comprises: an aperture, and a lens unit that includes a lens; a structure configured to support the camera; and a sensor with an always-on detection capability, wherein the sensor is attached to the structure.

In some aspects, a communication module of a user device includes a collar configured to be attached to a camera module of the user device, wherein the collar includes: a plurality of openings, wherein a first opening, of the plurality of openings, is configured to align with an aperture of a camera of the camera module; a light emitter embedded in the collar, wherein the light emitter is aligned with a second opening of the plurality of openings, and wherein the light emitter is configured to transmit light that includes a communication signal associated with the user device; and a sensor embedded in the collar, wherein the sensor is aligned with the second opening of the collar, and wherein the sensor is configured to capture an optical communication signal that is to be received by the user device.

In some aspects, a user device may include a camera module that includes a camera, wherein the camera comprises: an aperture, and a lens unit that includes a lens; and a sensor module comprising: a collar configured to be attached to the camera module, wherein the collar includes: a first opening that is configured to align with the aperture of the camera, and a second opening; and a sensor with an always-on detection capability, wherein the sensor is embedded in the collar and aligned with the second opening of the collar.

Aspects generally include a method, apparatus, system, computer program product, non-transitory computer-readable medium, user device, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Many user devices (e.g., mobile devices, computers, wearable devices, and/or the like) may include one or more cameras to permit a user to capture images using the user device. Furthermore, in some instances, a camera may be included on a display-side of the user device so that images of a user can be captured while the user is facing and/or interacting with a display (e.g., an organic light emitting diode (OLED) display) of the user device. It can be preferred (e.g., to enhance a user experience of the user device) that a display on a user device cover nearly the entirety of the display-side of the user device (e.g., with wall-to-wall displays). However, including a camera on the display-side of the user device may inherently require that a portion of the display-side of the user device not be covered by the display and/or that the display include an opening so that an aperture of the camera can be exposed to the environment of the display-side of the user device.

Furthermore, in some instances, the user device is configured to perform a detection analysis (e.g., a facial recognition analysis, a character recognition analysis, and/or the like) on the images captured by the display-side camera. For example, a detection analysis may be performed to activate (e.g., power on, wake-up, and/or the like) the display when a user is detected and/or unlock the display to permit a particular user to interact with the user device. It can be preferred (e.g., to enhance a user experience of the user device) that the user device employ always-on facial detection so that the display of the user device can be activated and/or unlocked without the user having to physically interact with the user device (e.g., pick up the user device, press a button of the user device, and/or the like). Additionally, or alternatively, it can be preferred (e.g., to enhance a user experience of the user device), that the user device be able to detect a character (e.g., a barcode, a quick response (QR) code, and/or the like) without the user having to physically interact with the user device. However, such always-on capabilities require that the camera (e.g., a camera on the display-side) is always on (e.g., always capturing images) while the user device is powered on. It can be preferred that the camera be a high-resolution camera (e.g., to enhance a user experience associated with capturing high-resolution images). However, such high-resolution cameras (e.g., cameras capable of capturing more than one megapixel or greater images) can consume relatively high amounts of power (e.g., greater than 100 milliwatts (mW)), which would quickly drain the power from a battery of the user device if the high-resolution camera was always on.

Some implementations described herein provide a sensor module that enables object detection (e.g., facial detection, character detection, and/or the like) and consumes a relatively small area of a display-side of a user device (e.g., a same area that is used for a camera module) to permit a display of the user device to cover nearly the entirety of the display-side. The sensor module may include a collar that has relatively the same dimensions (e.g., within a manufacturing tolerance, within a threshold percentage, and/or the like) of the camera module, such that the amount of area of the display-side of the user device that is consumed by the combination of the sensor module and camera module is equivalent to the amount of area of the display-side that would be consumed by the camera module without the sensor module. The sensor module may include one or more sensors embedded within the collar, which includes an opening that aligns with the camera of the camera module such that the collar fits around a lens unit of the camera module. In this way, a sensor module, as described herein, enables an opening in a display for a camera module to be more effectively utilized by enabling one or more sensors to use the opening without requiring additional openings, for the sensors, to be included in the display. In other words, the sensor module may utilize the same opening in the display that is available for a camera module.

Furthermore, as described herein, a sensor of the sensor module may be a low-resolution (e.g., less than one megapixel), low-power (e.g., consumes less than 10 mW) sensor that enables an always-on detection capability (e.g., always-on facial detection, always-on character detection, and/or always-on object detection). In this way, the sensor module described herein allows for always-on detection (e.g., always-on facial recognition, always-on character recognition, always-on object recognition, and/or the like) while consuming a relatively small area of a display-side of the user device (e.g., a same area that is consumed by an associated camera module).

Figure 1:
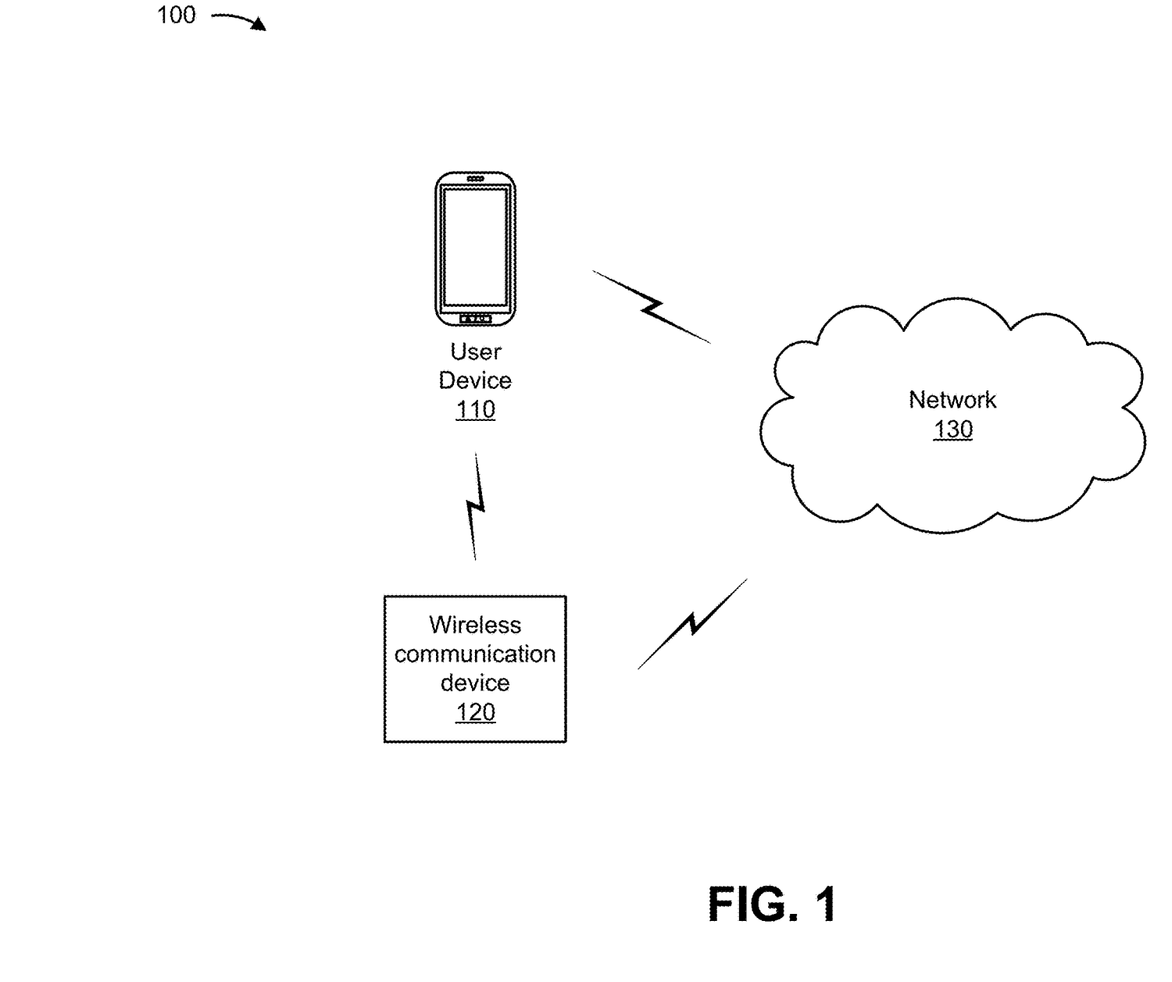
FIG. 1 is a diagram conceptually illustrating an example environment in which a sensor module described herein may be implemented, in accordance with various aspects of the present disclosure.

FIG. 1 is a diagram illustrating an example environment 100 in which a sensor module described herein may be implemented, in accordance with various aspects of the present disclosure. As shown in FIG. 1, environment 100 may include a user device 110, a wireless communication device 120, and/or a network 130. Devices of environment 100 may interconnect via wired connections, wireless connections, or a combination of wired and wireless connections.

User device 110 includes one or more devices capable of including one or more sensor modules described herein. For example, user device 110 may include one or more devices capable of receiving, generating, storing, processing, and/or providing information associated with one or more sensors described herein. More specifically, user device 110 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Similar to user device 110, wireless communication device 120 includes one or more devices capable of receiving, generating, storing, processing, and/or providing information associated with one or more sensors described herein. For example, wireless communication device 120 may include a base station, an access point, and/or the like. Additionally, or alternatively, similar to user device 110, wireless communication device 120 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Network 130 includes one or more wired and/or wireless networks. For example, network 130 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
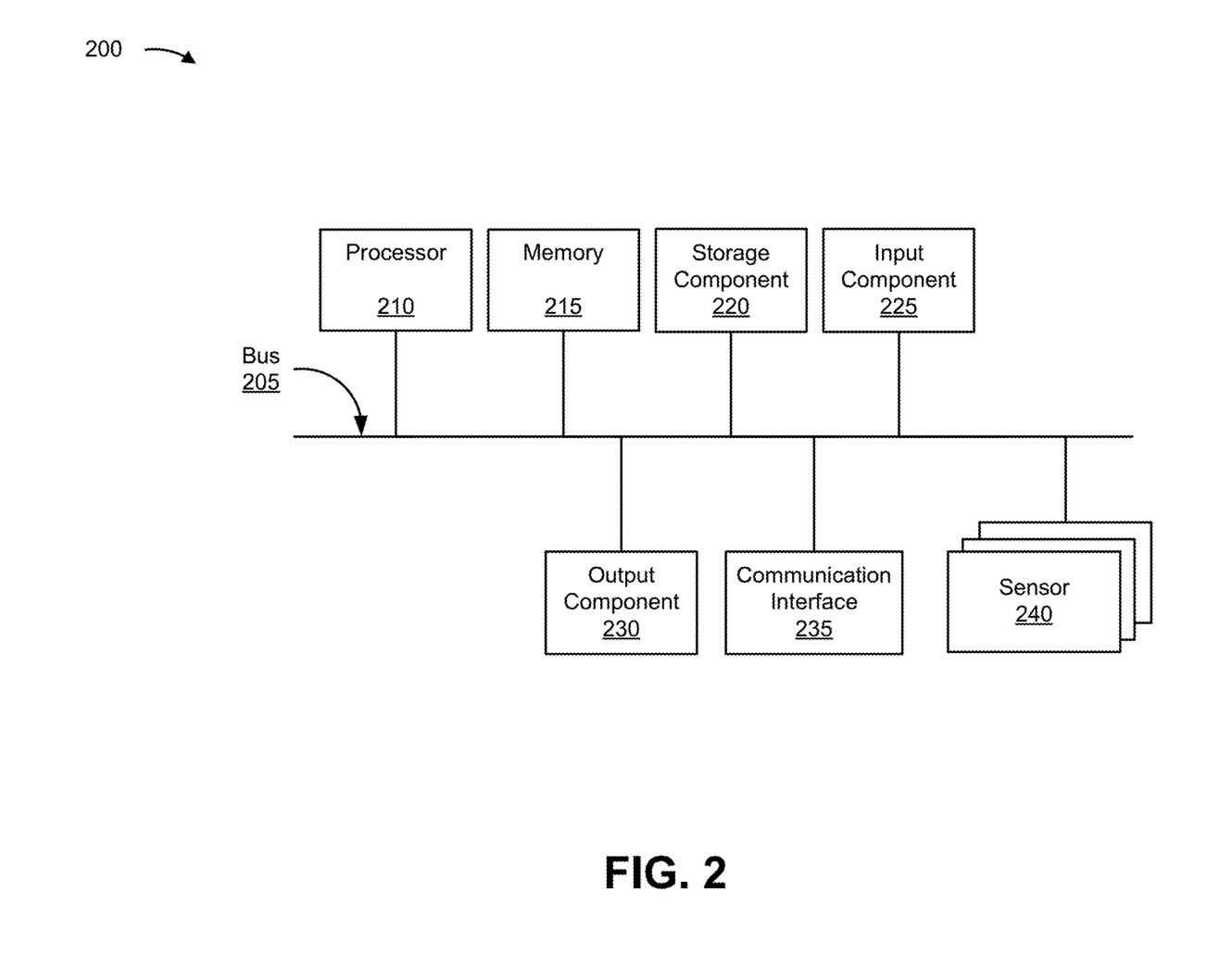
FIG. 2 is a diagram conceptually illustrating example components of one or more devices shown in FIG. 1, such as a user device, in accordance with various aspects of the present disclosure.

FIG. 2 is a diagram of example components of a device 200. Device 200 may correspond to user device 110 and/or wireless communication device 120. Additionally, or alternatively, user device 110, and/or wireless communication device 120 may include one or more devices 200 and/or one or more components of device 200. As shown in FIG. 2, device 200 may include a bus 205, a processor 210, a memory 215, a storage component 220, an input component 225, an output component 230, a communication interface 235, and one or more sensors 240 (referred to individually as a "sensor 240" and collectively as "sensors 240").

Bus 205 includes a component that permits communication among the components of device 200. Processor 210 includes a central processing unit (CPU), a graphics processing unit (GPU), an accelerated processing unit (APU), a digital signal processor (DSP), a microprocessor, a microcontroller, a field-programmable gate array (FPGA), an application-specific integrated circuit (ASIC), and/or another type of processing component. Processor 210 is implemented in hardware, firmware, or a combination of hardware and software. In some aspects, processor 210 includes one or more processors capable of being programmed to perform a function.

Memory 215 includes a random-access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a sensor for sensing information (e.g., an image sensor, a location sensor, an accelerometer, a gyroscope, an actuator, and/or the like). In some aspects, input component 225 may include a camera (e.g., a high-resolution camera, a low-resolution camera, and/or the like). Output component 230 includes a component that provides output from device 200 (e.g., a display, a speaker, and/or one or more light-emitting diodes (LEDs)).

Communication interface 235 includes a transceiver and/or a separate receiver and transmitter that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency (RF) interface, a universal serial bus (USB) interface, a Wi-Fi interface, a cellular network interface, a wireless modem, an inter-integrated circuit (I$^2$C), a serial peripheral interface (SPI), or the like.

Sensor 240 includes one or more devices capable of sensing characteristics associated with device 200. Sensor 240 may include one or more integrated circuits (e.g., on a packaged silicon die) and/or one or more passive components of one or more flex circuits to enable communication with one or more components of device 200.

Sensor 240 may include an optical sensor that has a field of view in which sensor 240 may determine one or more characteristics of an environment of device 200. In some aspects, sensor 240 may include a camera. For example, sensor 240 may include a low-resolution camera (e.g., a video graphics array (VGA)) that is capable of capturing images that are less than one megapixel, images that are less than 1216×912 pixels, and/or the like. Sensor 240 may be a low-power device (e.g., a device that consumes less than ten milliwatts (mW) of power) that has an always-on capability (e.g., to permit always-on facial detection, always-on character recognition, always-on object detection, and/or the like) while device 200 is powered on.

Additionally, or alternatively, sensor 240 may include magnetometer (e.g., a Hall effect sensor, an anisotropic magnetoresistive (AMR) sensor, a giant magneto-resistive sensor (GMR), and/or the like), a location sensor (e.g., a global positioning system (GPS) receiver, a local positioning system (LPS) device (e.g., that uses triangulation, multi-lateration, etc.), and/or the like), a gyroscope (e.g., a micro-electro-mechanical systems (MEMS) gyroscope or a similar type of device), an accelerometer, a speed sensor, a motion sensor, an infrared sensor, a temperature sensor, a pressure sensor, and/or the like.

Device 200 may perform one or more processes described herein. Device 200 may perform these processes in response to processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, the means for performing the processes and/or operations described herein may include bus 205, processor 210, memory 215, storage component 220, input component 225, output component 230, communication interface 235, sensor 240, and/or any combination thereof.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
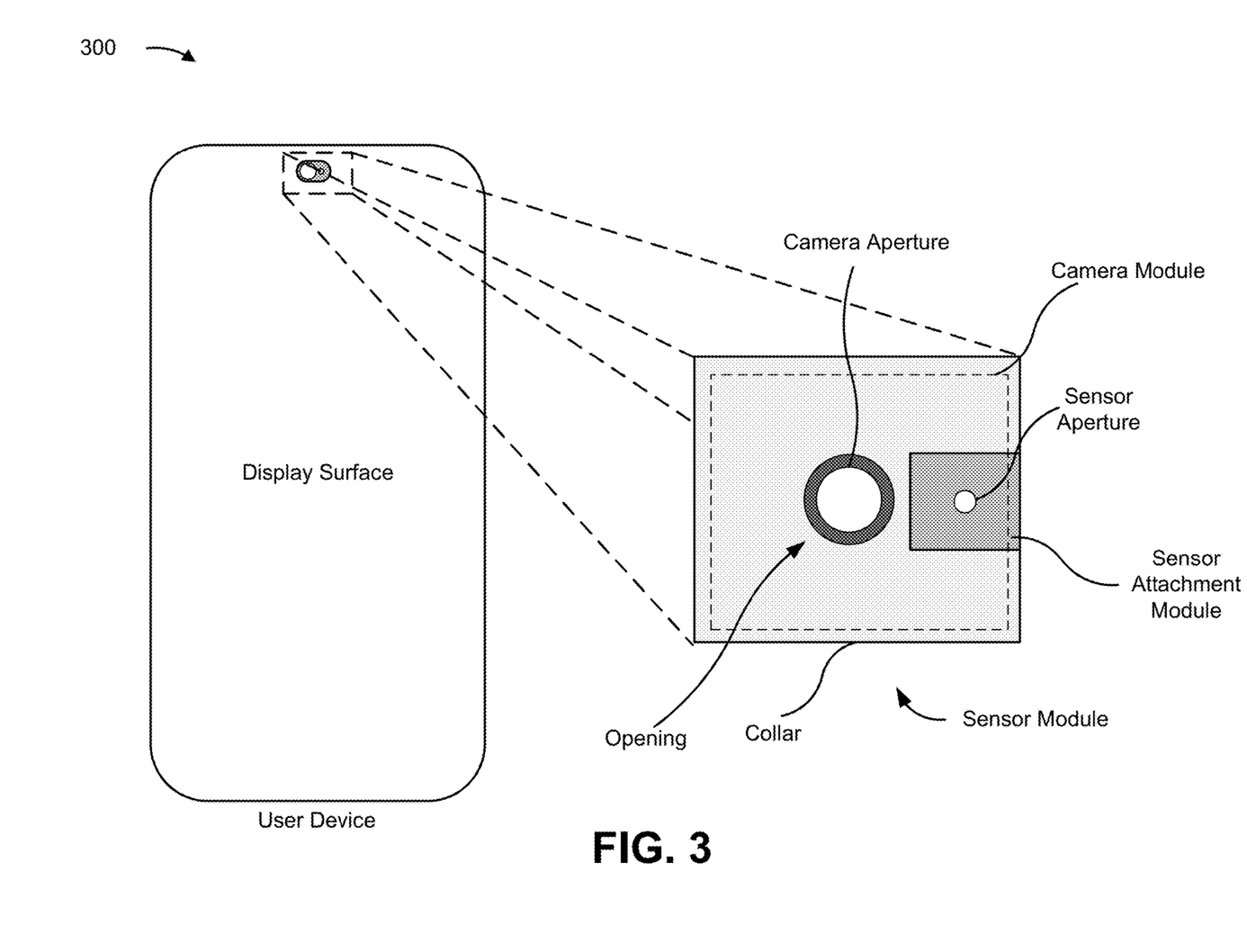
FIG. 3-7 are diagrams conceptually illustrating examples associated with a sensor module in accordance with various aspects of the present disclosure.

FIG. 3 is a diagram conceptually illustrating an example 300 associated with a sensor module in accordance with various aspects of the present disclosure. Example 300 includes a user device (e.g., user device 110) that includes a sensor module and a camera module described herein. A top view of the sensor module and camera module are shown in FIG. 3. Accordingly, the sensor module is shown overlapping (or covering from the top view) the camera module (dotted line). The sensor module may be attached to (e.g., fastened, fixed, connected, glued, and/or the like) to the camera module (e.g., a structure of the camera module) to permit the camera module and the sensor module to be installed (e.g., prior to installing the display surface) within the user device as a single assembled unit.

In example 300, the sensor module includes a collar with a sensor embedded within a sensor attachment module. The sensor attachment module may be embedded within the collar. In some aspects, the sensor may be embedded (e.g., attached to, fit within, fastened to, and/or the like) directly within the collar (e.g., without a separable sensor attachment module) and/or the sensor attachment module may be formed as part of the collar. As shown, the collar includes an opening that aligns with a camera aperture. The sensor attachment module (and/or collar) includes a second opening that corresponds to a sensor aperture for the sensor.

As shown in FIG. 3, a portion of the display surface may cover the sensor module (e.g., except for the camera aperture and/or the sensor aperture). In this way, the display surface of the user device covers the majority of the user device, except for a relatively small portion to permit apertures of a camera and a sensor to be exposed to the display-side of the user device.

As indicated above, FIG. 3 is provided as an example. Other examples are possible and may differ from what was described above in connection with FIG. 3.

Figure 4:
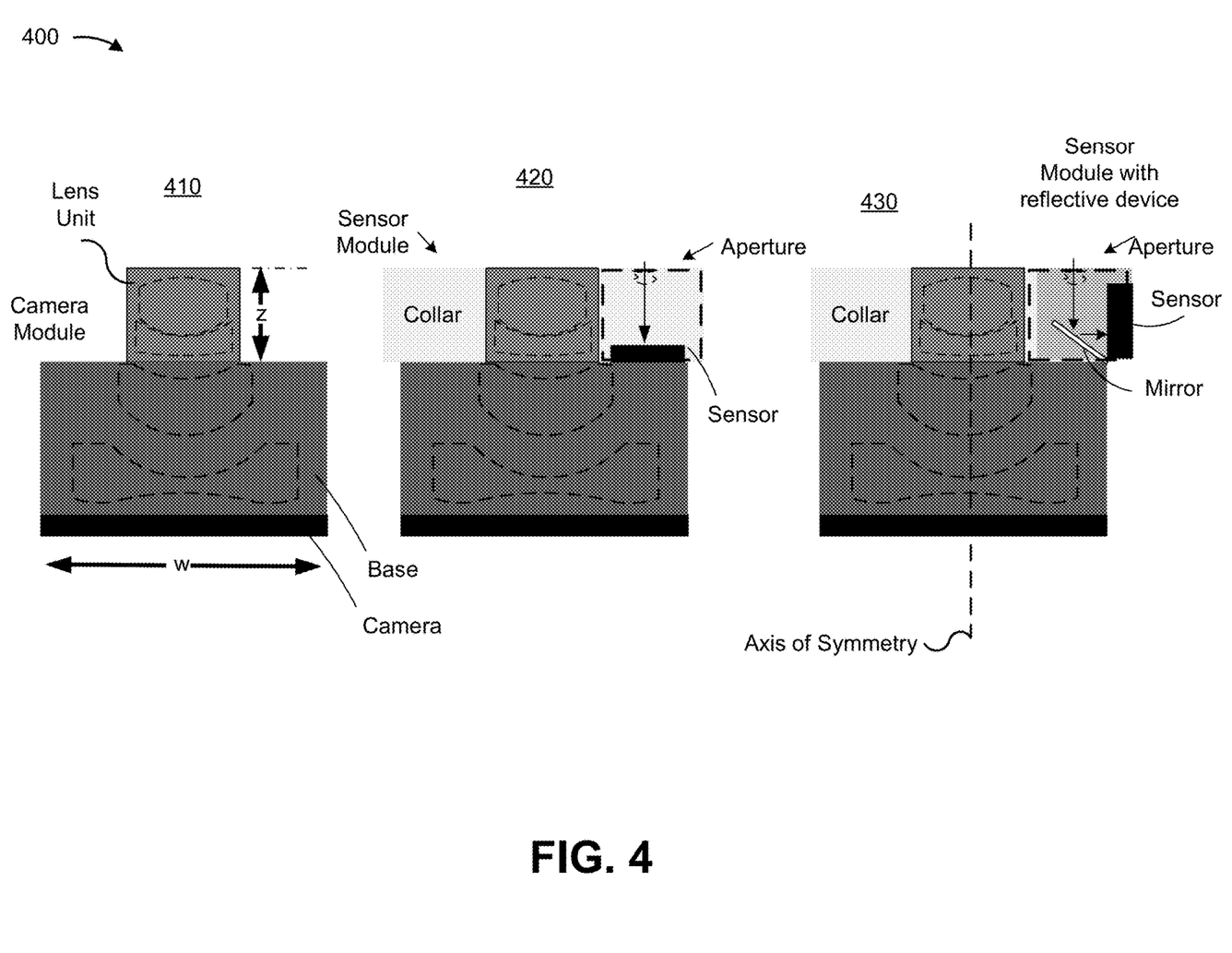

FIG. 4 is a diagram conceptually illustrating an example 400 associated with a sensor module in accordance with various aspects of the present disclosure. Example 400 illustrates a plan view of an assembly and/or combination of a sensor module and a camera module, as described herein.

As shown in FIG. 4, and by reference 410, the camera module may include a plurality of lenses (shown as dotted lines) within a structure. One or more of the lenses may be included within a lens unit that extends from a base of the camera module (which may also include one or more lenses). The lens unit may correspond to a barrel housing of the camera module that is configured to hold lenses that have a relatively smaller diameter (or width) than other lenses of the camera module that are in the base of the camera module. The base of the camera module may have a width w. Accordingly, the lens unit may have a width that is less than the width w (e.g., the width of the lens unit may be approximately w/3, w/2, and/or the like). Further, the lens unit may have a height z.

The camera of the camera module may be a high-resolution camera that is powered by a power supply (e.g., a battery) of a user device (e.g., user device 110, device 200, and/or the like) when installed within the user device. As a high-resolution camera, the camera may require 100 mW of power or more to capture images and/or video. The camera may be communicatively coupled to a device (e.g., processor 210) via a communication bus (e.g., bus 205) to permit the camera to be controlled and/or permit the camera to provide captured images to the device.

As further shown in FIG. 4, and by reference number 420, the sensor module includes a collar, a sensor, an opening, and an aperture for the sensor (which may also be considered as an opening in the collar). The collar may receive the lens unit in the opening, such that the collar fits to the camera module when the lens unit is received within the opening. The collar may have a height that is substantially equal to the height z of the lens unit. The collar may be any suitable material capable of being molded to permit the sensor to be embedded and/or installed within the collar.

The sensor may be any suitable sensor that is capable of sensing, via the aperture, one or more characteristics of an environment of the sensor module (which may be the same environment as an environment of a user device, once installed in the user device). For example, the sensor may be a low-resolution camera, an optical sensor capable of detecting light (e.g., ambient light, infrared light, an optical communication signal, and/or the like), an infrared sensor, a pressure sensor, a microphone, and/or the like. The sensor of the sensor module may be a low-power sensor that requires less than 10 mW of power to operate. Accordingly, the sensor may require less power than the camera of the camera module. For example, the sensor may be a low-resolution camera that requires less than 10 mW (e.g., 1 mW, 2 mW, 5 mW, and/or the like) to capture an image and/or video of the environment via the aperture. Accordingly, the sensor may be configured and/or designed to use less power (e.g., less power from a battery of the user device) than the camera.

In this way, the sensor may enable an always-on detection capability that enables a user, a character, an object, and/or the like to be detected without the user interacting with a touch input component of the user device, without picking up (and/or touching) the user device, and/or the like. Furthermore, the sensor, in always-on mode, may record a sliding window of images, captured by the sensor, as pre-roll video (e.g., video that is captured in a time period before and/or during facial detection of a user, character detection of a character, object detection of an object, and/or the like). Accordingly, the sliding window of images can be saved as pre-roll video that can be access, via the user device, by a user (e.g., to permit the user to be identified via the pre-roll video).

Additionally, or alternatively, the sensor may be an infrared sensor capable of performing always-on detection when the environment of the sensor module is dark. For example, a device associated with the sensor module may include a low power light emitter that emits infrared light and the infrared sensor may sense reflections of the emitted light that can be analyzed for facial detection, character detection, object detection, and/or the like.

As further shown in FIG. 4, and by reference number 430, the sensor module may include a reflective device to permit the sensor to be in an offset position relative to an axis of symmetry (e.g., the center axis of the opening of the collar) of the sensor module. As shown, the reflective device may redirect a field of view of the sensor through the aperture so that the environment can be captured (e.g., in an image) and/or analyzed by the sensor. In some aspects, the sensor module may include an optic device (e.g., a lens, a prism, and/or the like) that is configured to define the field of view of the sensor. The mirror (and/or an optic device) may be included within a sensor attachment module that is embedded within the collar. In such a case, the sensor attachment module may be separable and/or pre-assembled prior to being installed within the collar of the sensor module.

In this way, the sensor module and/or camera module of example 400 may permit an always-on detection for a user device associated with the sensor module and/or camera module, while being configured to consume a same area of a display-side of the user device as the camera module alone.

As indicated above, FIG. 4 is provided as an example. Other examples are possible and may differ from what was described above in connection with FIG. 4.

Figure 5:
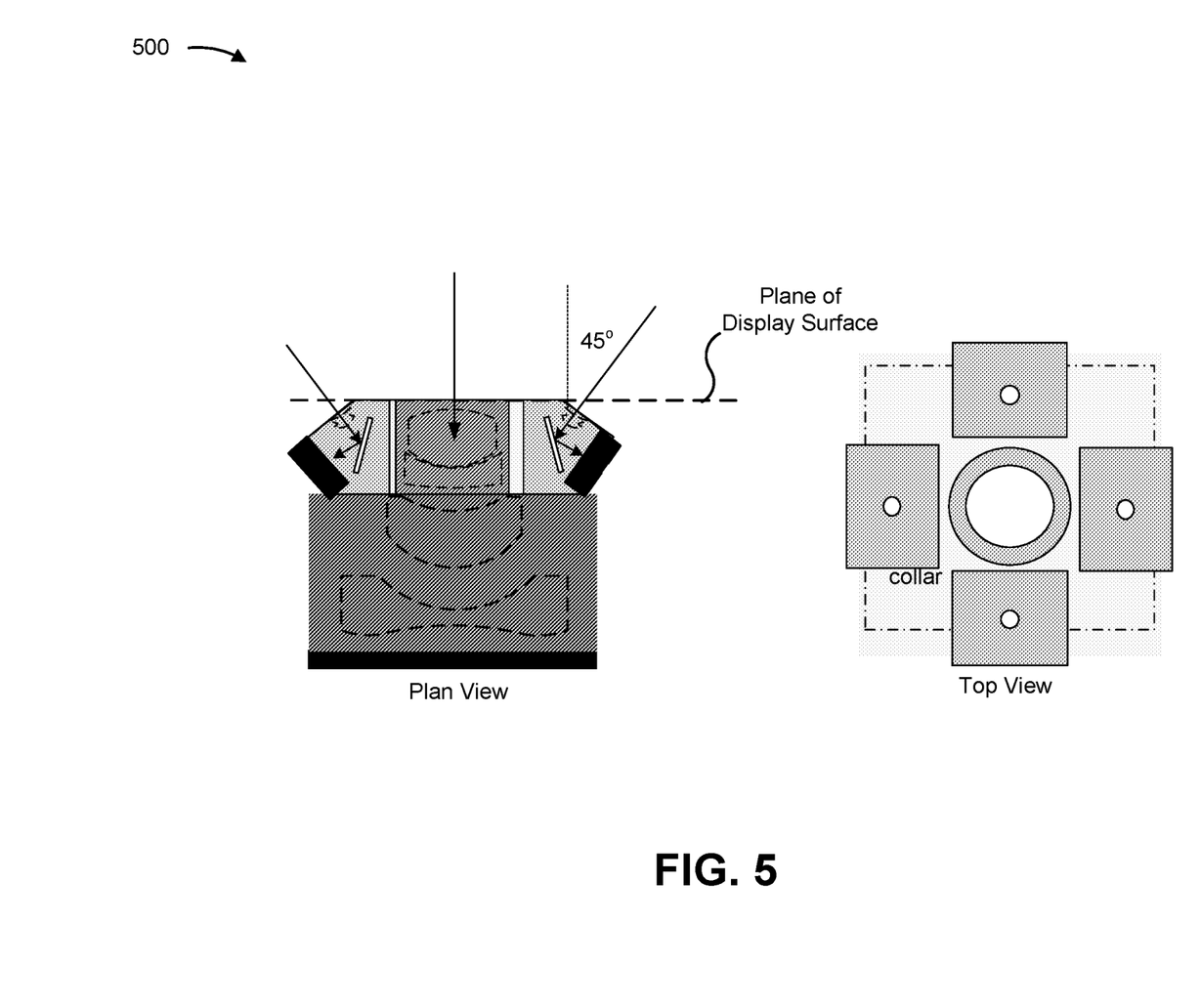

FIG. 5 is a diagram conceptually illustrating an example 500 associated with a sensor module in accordance with various aspects of the present disclosure. Example 500 includes a sensor module with a plurality of sensors. A plan view and a top view of the sensor module is shown in FIG. 5. The collar of the sensor module may include corresponding sensor apertures (or sensor openings) for the plurality of sensors. Each of the plurality of sensors may be low-power sensors as described herein. Each of the plurality of sensors may be a same type of sensor (e.g., all of the sensors of the plurality of sensors may be or may include low-resolution cameras, infrared sensors, and/or the like). Alternatively, one of the plurality of sensors may be a different type of sensor from another one of the plurality of sensors (e.g., one sensor may be a low-resolution camera and the other may be an infrared sensor).

As shown in FIG. 5, multiple sensors are mounted around the camera aperture. For example, one or more pairs of sensors may include sensors that are opposite one another (e.g., on opposite sides of the opening of the sensor module).

Each sensor in example 500 may have an effective field of view angled away from that of the camera. As shown, the sensor field of view may be angled at an offset of approximately 45 degrees from that of the camera field of view center line (e.g., which may correspond to an axis of symmetry of the sensor module and/or camera module). In some aspects, the individual sensors within the collar may be orientated at an angle (e.g., approximately 45 degrees, approximately 30 degrees, approximately 60 degrees, and/or the like) from an axis of symmetry of the sensor module. Example 500 may permit the plurality of sensors (shown as four sensors positioned 90 degrees from each other relative to the opening or center of the sensor module), a hemispherical field of view (e.g., a 180-degree×360-degree field of view) of the display-side of a user device (once the sensor module is installed in the user device). Accordingly, the sensor module enables a foveated like visual sensing capability (e.g., which may mimic and/or correlate to a human visual system).

In this way, the sensor module may permit an always-on detection capability with a hemispherical view.

As indicated above, FIG. 5 is provided as an example. Other examples are possible and may differ from what was described above in connection with FIG. 5.

Figure 6:
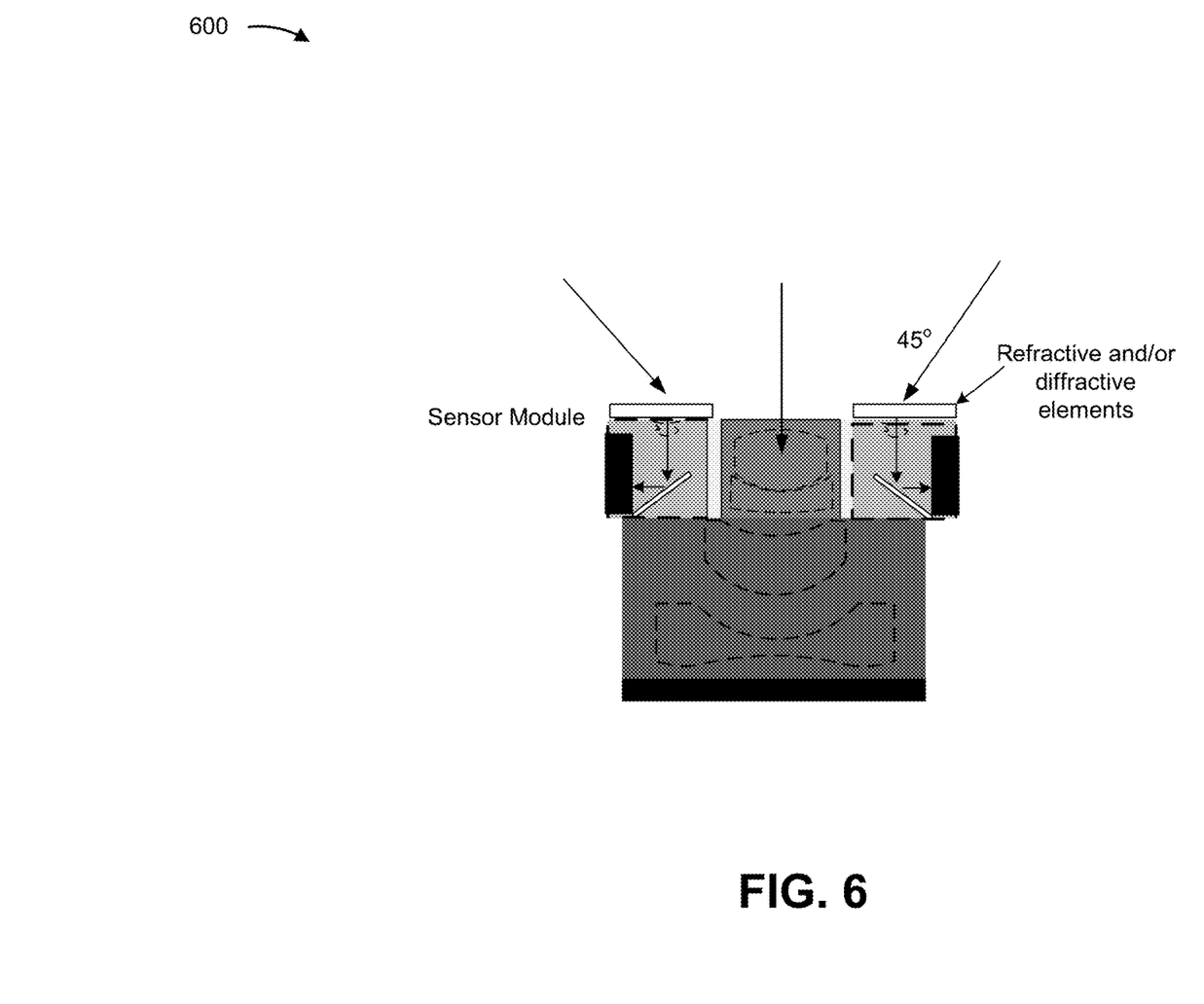

FIG. 6 is a diagram conceptually illustrating an example 600 associated with a sensor module in accordance with various aspects of the present disclosure. Example 600 provides another example of a sensor module with a plurality of sensors. Similar to example 500, the sensor module of example 600 may permit a hemispherical field of view. For example, as shown, the sensor module may include one or more refractive elements (e.g., microprisms) and/or diffractive elements that redirect light (e.g., at approximately a 45-degree angle, at approximately a 30-degree angle, at approximately a 60-degree angle, and/or the like) into the sensor module. In this way, a display-side surface of the sensor module may be flush (e.g., coplanar) with and/or beneath a plane of the display surface (whereas the display-side surface of the sensor module of example 500 may not be flush with the plane of the display surface).

As indicated above, FIG. 6 is provided as an example. Other examples are possible and may differ from what was described above in connection with FIG. 6.

Figure 7:
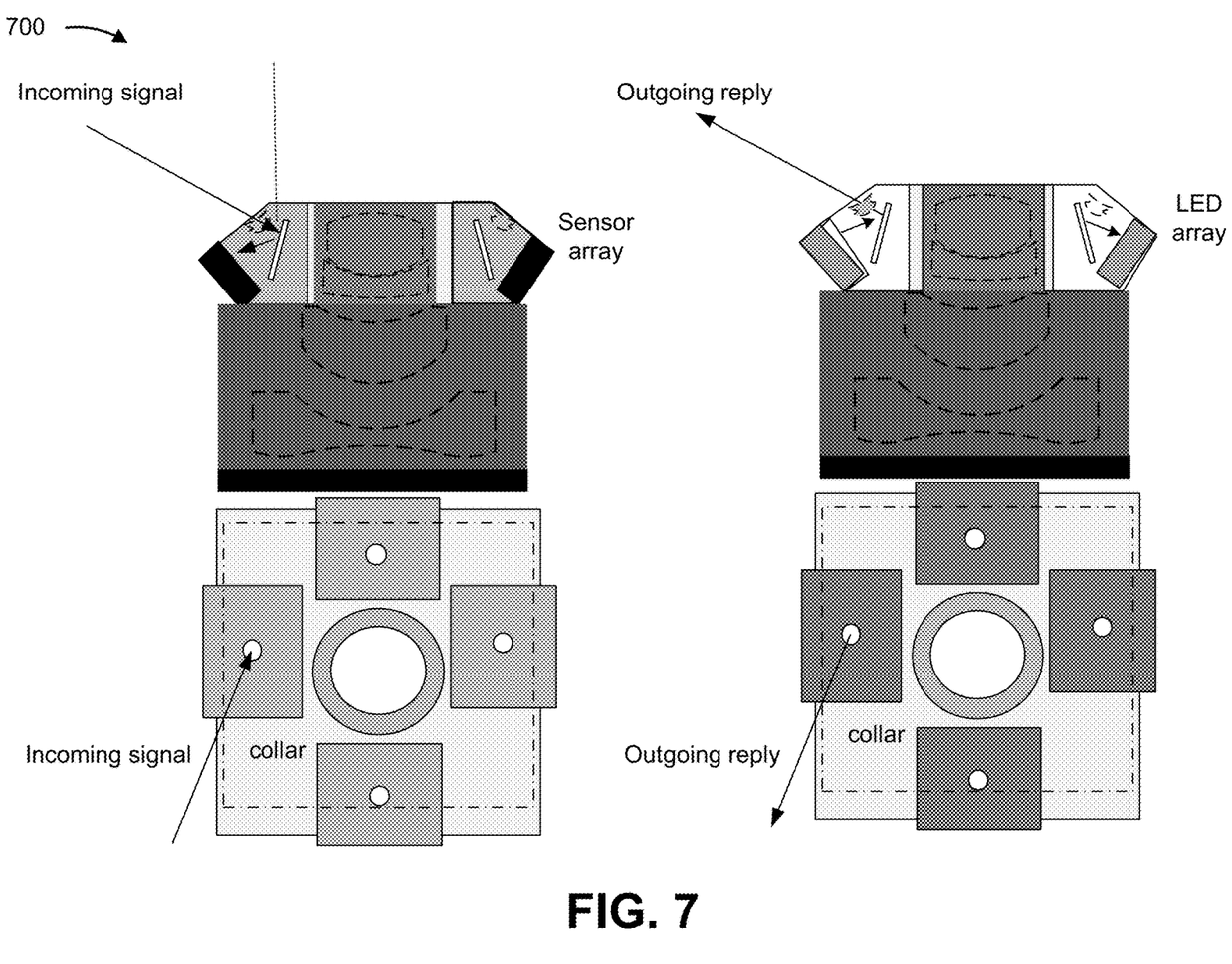

FIG. 7 is a diagram conceptually illustrating an example 700 associated with a sensor module in accordance with various aspects of the present disclosure. Example 700 includes a sensor module that facilitates optical communication, as described herein. Accordingly, using the sensor module of example 700, a user device (e.g., user device 110, device 200, and/or the like) may optically communicate with one or more devices (e.g., wireless communication device 120) using light (e.g., light that includes a communication signal).

The sensor module may include an optical sensor (shown as a sensor array) that is capable of receiving incoming signals (e.g., that are to provide information to the user device). Further, the sensor module may include a light emitter (shown as a light emitting diode (LED) array) that is configured to transmit light that includes an outgoing signal (e.g., a communication signal with information transmitted from the user device).

Similar to the sensor modules of examples 500 and 600 of FIGS. 5 and 6, respectively, a plurality of sensors may be configured within the sensor module to provide a hemispherical field of view (e.g., of a display-side of the user device). For optical communication (e.g., which may be associated with cellular communication), the sensor module of example 700 enables an optical signal to be received from all angles of a display-side of the user device. Further, such sensors may be low power to permit the sensors to always be on so that the signals can always be received (when the user device is powered on). Furthermore, the sensor module may enable the sensors to provide line of sight communication and/or signal directionality as needed over the collective hemispherical field of view of the user device.

In addition to receiving line of sight optical information, the sensor module permits line of sight emission via the light emitters embedded in the sensor module. For example, for a signal received from a specific direction, an emitted reply can be transmitted in the reverse direction. Accordingly, the sensor module may include sensor attachment modules with both optical sensors to facilitate receipt of optical communication signals and light emitters to facilitate transmission of optical communication signals. Therefore, for a signal received at position (x,y) on one or more optical sensors of the sensor module, a reply can be given using an LED at position (x,y) of the corresponding one or more sensor attachment modules that include the optical sensors (e.g., which faces the same direction from which the signal was received).

In this way, this way, a user device may be enabled to optically communicate via the sensor module, as described herein, while including a display that substantially covers the display-side of the user device.

As indicated above, FIG. 7 is provided as an example. Other examples are possible and may differ from what was described above in connection with FIG. 7.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A sensor module comprising:
   a collar configured to be attached to a camera module for a user device,
      wherein the collar includes:
         a first opening that is configured to align with an aperture of a camera of the camera module, and
         a second opening;
   a sensor attachment module in the collar;
   a sensor within the sensor attachment module,
      wherein the sensor is in an offset position relative to an axis associated with the sensor module; and
   a reflective device that redirects light towards the sensor,
      wherein the light enters the second opening in a direction that is parallel relative to the axis associated with the sensor module and is redirected in a direction that is perpendicular to the axis associated with the sensor module.

2. The sensor module of claim 1, wherein the sensor comprises a low-power sensor that facilitates an always-on detection capability.

3. The sensor module of claim 1, wherein the first opening is configured to receive a lens unit of the camera.

4. The sensor module of claim 1, wherein the camera comprises a high-resolution camera and the sensor comprises a low-resolution camera.

5. The sensor module of claim 1, further comprising a light emitter configured to emit the light into a field of view of the sensor,
   wherein the light enables the sensor to detect a user, a character, or an object.

6. The sensor module of claim 1, further comprising a light emitter configured to emit other light,
   wherein the other light facilitates transmission of a communication signal associated with the user device.

7. The sensor module of claim 1, wherein the sensor attachment module is embedded in the collar.

8. The sensor module of claim 1, wherein the sensor attachment module includes the reflective device.

9. The sensor module of claim 1, wherein a display-side surface of the collar, when the sensor module is installed within the user device, is configured to be coplanar or beneath a plane of a display surface of the user device.

10. The sensor module of claim 1, wherein, when the sensor module is installed within the user device, the sensor is beneath at least one of:
    a diffractive element of a display surface of the user device, or
    a refractive element of a display surface of the user device.

11. The sensor module of claim 1, wherein the sensor is one of a plurality of sensors in the collar and the second opening is one of a plurality of sensor openings of the collar.

12. The sensor module of claim 11, wherein the plurality of sensors are configured to enable a user, a character, or an object to be detected within a hemispherical field of view relative to a display of the user device.

13. The sensor module of claim 1, wherein the sensor is further configured to capture an optical communication signal that is to be received by the user device.

14. The sensor module of claim 1, wherein the sensor is designed to use less power than the camera.

15. The sensor module of claim 1, wherein the sensor consumes less than ten milliwatts (mW) of power.

16. A system for a user device, the system comprising:
    a camera, wherein the camera comprises:
       an aperture, and a lens unit that includes a lens;
    a structure configured to support the camera;
    a collar configured to be attached to the structure;
    a sensor attachment module;
    a sensor, within the sensor attachment module, with an always-on detection capability,
       wherein the sensor is in an offset position relative to an axis of an opening of the collar, and a reflective device that redirects light towards the sensor, wherein the light enters a second opening in a direction that is parallel relative to the axis of the opening of the collar and is redirected in a direction that is perpendicular to the axis o the opening of the collar.

17. The camera module system of claim 16, wherein the sensor is one of a plurality of sensors embedded in the collar and the opening is one of a plurality of openings of the collar; and
  wherein the plurality of sensors are configured to enable a user, a character, or an object to be detected within a hemispherical field of view relative to a display of the user device.

18. The system of claim 16, wherein the sensor comprises a low-power sensor that facilitates the always-on detection capability.

19. The system of claim 16, wherein the camera comprises a high-resolution camera and the sensor comprises a low-resolution camera.

20. The system of claim 16, wherein the sensor consumes less than ten milliwatts (mW) of power.

21. A communication module of a user device, the communication module comprising:
  a collar configured to be attached to a camera module of the user device,
    wherein the collar includes:
      a first opening that is configured to align with an aperture of a camera of the camera module, and
      a second opening;
  a sensor attachment module in the collar;
  a sensor in the sensor attachment module,
    wherein the sensor is in an offset position relative to an axis of symmetry associated with the collar; and
  a reflective device, in the collar, that redirects light towards the sensor,
    wherein the light enters the second opening in a direction that is parallel relative to the axis of symmetry and is redirected in a direction that is perpendicular to the axis of symmetry.

22. The communication module of claim 21, wherein the sensor comprises a low-power sensor that facilitates an always-on detection capability.

23. The communication module of claim 21, wherein the camera comprises a high-resolution camera and the sensor comprises a low-resolution camera.

24. The communication module of claim 21, wherein the sensor is one of a plurality of sensors embedded in the collar, and the second opening is one of a plurality of sensor openings of the plurality of openings, and
  wherein the plurality of sensors are configured to enable optical communication within a hemispherical field of view relative to a display-side of the user device.

25. The communication module of claim 21, wherein the sensor consumes less than ten milliwatts (mW) of power.

26. A user device comprising:
  a camera module that includes a camera,
    wherein the camera comprises:
      an aperture, and
      a lens unit that includes a lens; and
  a sensor module comprising:
    a collar configured to be attached to the camera module,
      wherein the collar includes:
        a first opening that is configured to align with the aperture of the camera, and
        a second opening;
    a sensor attachment module;
    a sensor with an always-on detection capability,
      wherein the sensor in the sensor attachment module,
      wherein the sensor is in an offset position relative to an axis associated with the sensor module; and
    a reflective device that redirects light towards the sensor, and
      wherein the light enters the second opening in a direction that is parallel relative to the axis associated with the sensor module and is redirected in a direction that is perpendicular to the axis associated with the sensor module.

27. The user device of claim 26, further comprising:
  a communication module comprising:
    a light emitter embedded in the collar,
      wherein the light emitter is aligned with the second opening, and
      wherein the light emitter is configured to transmit light that includes a communication signal associated with the user device,
    wherein the communication module utilizes the sensor to capture an optical communication signal that is to be received by the user device.

28. The user device of claim 26, wherein the sensor comprises a low-power sensor that facilitates the always-on detection capability.

29. The user device of claim 26, wherein the camera comprises a high-resolution camera and the sensor comprises a low-resolution camera.

30. The user device of claim 26, wherein the sensor is designed to use less power than the camera.

31. The user device of claim 26, wherein the sensor consumes less than ten milliwatts (mW) of power.

* * * * *